United States Patent
Chen et al.

(10) Patent No.: US 6,685,820 B2
(45) Date of Patent: Feb. 3, 2004

(54) METHOD FOR TREATING SPENT TIN/LEAD STRIPPING SOLUTION

(75) Inventors: Kuo-Chin Chen, Tun-Cherng (TW); Ching-Hwa Chang, Tun-Cherng (TW); Yu-Feng Lin, Tun-Cherng (TW); Tai-Sheng Yuan, Tun-Cherng (TW); Hung-Ming Wang, Tun-Cherng (TW); Jenn-Fang Wu, Tun-Cherng (TW); Huei-Yin Cheng, Tun-Cherng (TW)

(73) Assignees: Amia Co., Ltd., Taoyuan Hsien (TW); Persee Chemical Co., Ltd., Taipei Hsien (TW)

( * ) Notice: Subject to any disclaimer, the term of this patent is extended or adjusted under 35 U.S.C. 154(b) by 91 days.

(21) Appl. No.: 10/132,143

(22) Filed: Apr. 26, 2002

(65) Prior Publication Data

US 2003/0200838 A1 Oct. 30, 2003

(51) Int. Cl.$^7$ .................................. C25C 1/00
(52) U.S. Cl. .................. 205/560; 205/252; 205/291; 205/299; 205/300; 205/301; 205/508; 205/544; 205/586; 205/597; 205/610; 205/717; 205/719; 205/721
(58) Field of Search ................................. 205/252, 291, 205/299, 300, 301, 508, 544, 560, 586, 597, 610, 717, 719, 721

(56) References Cited

U.S. PATENT DOCUMENTS 5,755,950 A * 5/1998 Bell ........................ 205/610

* cited by examiner

Primary Examiner—Robert R. Koehler
(74) Attorney, Agent, or Firm—Rosenberg, Klein & Lee

(57) ABSTRACT

The present invention relates to a method for treating spent tin or tin/lead stripping solution used in the electronic industry, particularly in the manufacture of printed circuit boards or a lead frames. Said method comprises (i) electrolytically reducing copper ions in the solution to copper at a low temperature; (ii) electrolytically oxidizing $Sn^{2+}$ and $Pb^{2+}$ in the solution at a high temperature to form solid tin and lead oxides and hydroxides; (iii) separating solid tin and lead oxides and hydroxides from the solution; (iv) dissolving tin and lead oxides and hydroxides obtained in step (iii) in a strong alkali or acidic solution; and (v) electrolytically reducing the alkali or acidic solution obtained in step (iv) at a high temperature to recover metallic tin and lead. Also, the filtrate obtained in step (iii) above is useful for preparing fresh tin or tin/lead stripping solution.

20 Claims, 1 Drawing Sheet

METHOD FOR TREATING SPENT TIN/LEAD STRIPPING SOLUTION

BACKGROUND OF THE INVENTION

1. Field of the Invention

The present invention relates to a method for treating a spent tin or tin/lead stripping solution used in the electronic industry, particularly in the manufacture of printed circuit boards or lead frames. More specifically, the present invention relates to a method for treating a spent tin or tin/lead stripping solution to recover metals, such as copper, tin, and lead from the solution.

2. Description of the Related Art

In a common printed circuit board manufacturing process, tin or tin/lead is usually electroplated onto a copper layer to serve as an etch-resistance layer. After the non-circuitry regions of the copper layer are etched away, a nitric acid based solution is often used for stripping the electroplated tin or tin/lead layer, thereby exposing the copper circuitry.

The nitric acid based solutions comprise nitric acid and ferric nitrate. When the concentration of free nitric acid is lower than 4N or the concentration of tin is higher than 100 g/L during stripping, it is necessary to replace the spent stripping solution with fresh stripping solution. Normally, the spent stripping solution comprises about 2–15 g/L $Cu^{2+}$, about 1–40 g/L $Fe^{3+}$ or $Fe^{2+}$, about 10–120 g/L $Sn^{4+}$ or $Sn^{2+}$, about 0–5 g/L $Pb^{4+}$ or $Pb^{2+}$ and about 2.0–6.0N free nitric acid. Since $Sn^{2+}$ is oxidized to $Sn^{4+}$ that forms tin oxides or hydroxides, the concentration of $Sn^{2+}$ in the waste stripping solution is sometimes lower than about 10 g/L during the storage or transportation of the spent stripping solution. Therefore, the spent stripping solution should be further treated for environmental considerations.

The conventional method for treating spent stripping solution is neutralization. For example, sodium hydroxide is added to the spent stripping solution to neutralize the free nitric acid and adjust the pH value to 8–13 such that most metallic cations are converted to metal oxide or hydroxide precipitates. The solid metallic oxides or hydroxides obtained through filtration are subjected to a refining process to recover the metallic tin. The resulting filtrate is then vaporized to produce sodium nitrate crystals.

However, the foregoing method requires use of large amounts of sodium hydroxide, and the resulting sodium nitrate crystals do not possess commercial benefits. Hence, Taiwan Patent Publication No. 177,911, entitled "A method for recovering metallic tin from spent tin stripping solutions," teaches use of a neutralizer, a precipitant and a reducing agent to make the treated effluent meet environmental requirements and to recover metallic tin from the spent stripping solution. However, the process in the '911 patent still requires use of large amounts of a neutralizer and a reducing agent so the '911 patent still has economic disadvantages. Further, Taiwan Patent Publication No. 258, 758, entitled "A method and an apparatus for regeneration of tin-electroplating solution," describes a method for separating Fe, Cr and Sn ions from the electroplating solution by using ion exchange resins to regenerate tin flux and to recover metallic Sn. However, the method set forth in the '758 patent involves complex procedures so the method is not useful for treating spent tin/lead stripping solution. Therefore, there is a need for methods for treating a spent tin/lead stripping solution in a cost-effective, simple and efficient manner.

SUMMARY OF THE INVENTION

The objective of the present invention is to provide a method for treating a spent tin or tin/lead stripping solution to recover metals, such as copper, tin, and lead from the solution. The method comprises (i) electrolytically reducing copper ions in the solution to copper at a low temperature; (ii) electrolytically oxidizing $Sn^{2+}$ and $Pb^{2+}$ in the solution at a high temperature to form solid tin and lead oxides and hydroxides; (iii) separating solid tin and lead oxides and hydroxides from the solution; (iv) dissolving tin and lead oxides and hydroxides obtained in step (iii) in a strong alkali or acidic solution; and (v) electrolytically reducing the alkali or acidic solution obtained in step (iv) at a high temperature to recover metallic tin and lead.

Another advantage of the present invention is that the filtrate obtained in step (iii) of the method is useful for preparing fresh tin or tin/lead stripping solution.

DETAILED DESCRIPTION OF THE PREFERRED EMBODIMENTS

Figure 1:
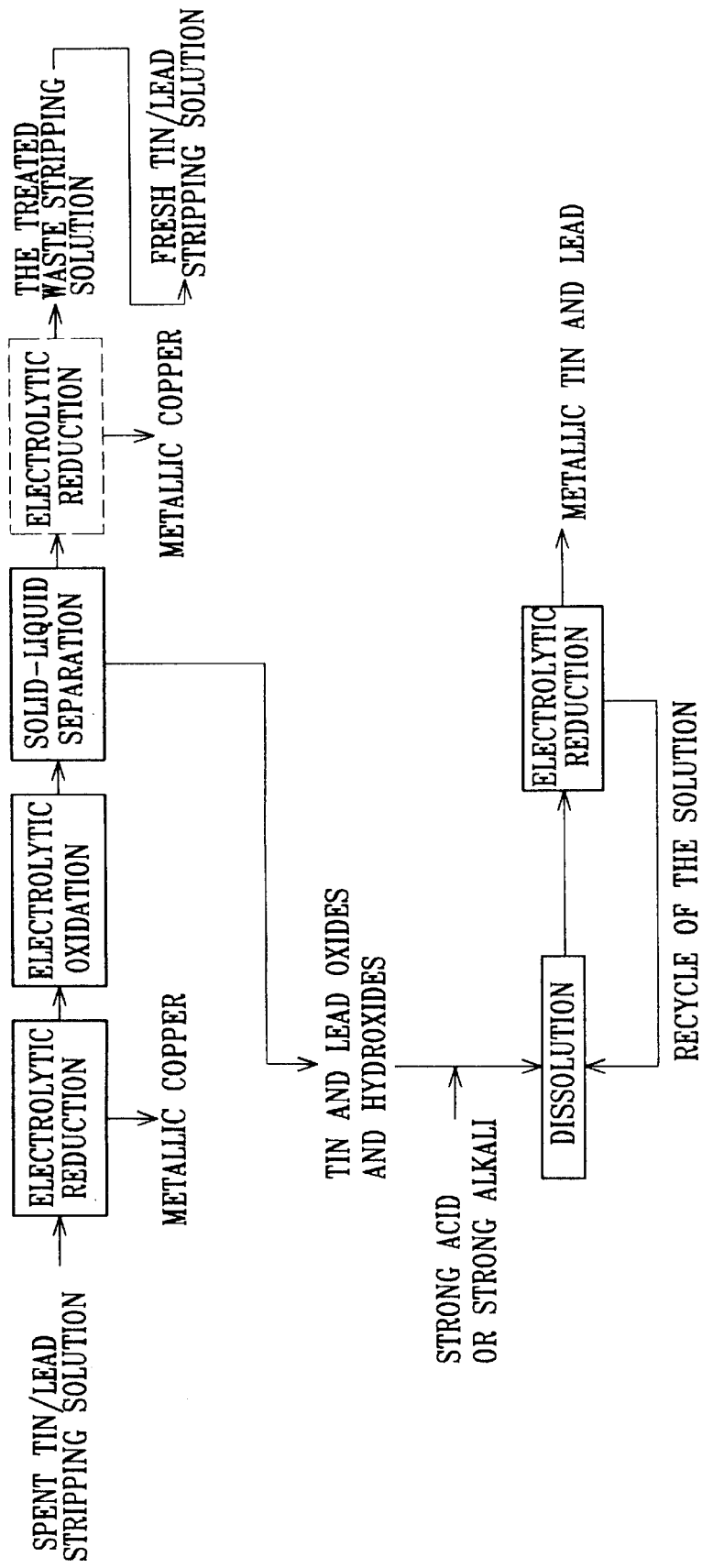
FIG. 1 is a flow chart of the method in accordance with the present invention to treat spent tin or tin/lead stripping solution, in which the dashed block is an optional step.

The present invention is directed to a method for treating a spent tin or tin/lead stripping solution. The method in accordance with the present invention to treat spent tin or tin/lead stripping solution comprises (i) electrolytically reducing copper ions in the solution to copper at a low temperature; (ii) electrolytically oxidizing $Sn^{2+}$ and $Pb^{2+}$ in the solution at a high temperature to form solid tin and lead oxides and hydroxides; (iii) separating solid tin and lead oxides and hydroxides from the solution; (iv) dissolving tin and lead oxides and hydroxides obtained in step (iii) in a strong alkali or acidic solution; and (v) electrolytically reducing the alkali or acidic solution obtained in step (iv) at a high temperature to recover metallic tin and lead.

The step of electrolytically reducing copper ions to metallic copper (i) is performed at a low temperature, preferably at about −5° C. to about 40° C. so that it is possible to suppress hydrogen and nitrate ions being reduced to hydrogen gas and nitroxides ($NO_x$), respectively. Advantageously, the electrolytic reduction step (i) is performed at a temperature as low as possible as long as ice is not formed. During the electrolytic reduction step (i), the applied electric potential difference between the anode and cathode is from about 1 to about 5 volts.

Further, the step of electrolytically oxidizing $Sn^{2+}$ and $Pb^{2+}$ in the solution to tin and lead oxides and hydroxides (ii) is carried out at a high temperature, preferably at about 45° C. to about 100° C. Under such conditions, $Sn^{2+}$ and $Pb^{2+}$ will be quickly oxidized to $Sn^{4+}$ and $Pb^{4+}$, and tin and lead oxide and hydroxide precipitates can be quickly formed. Advantageously, the temperature used can be as high as possible such that no vigorous boiling of nitrogen oxides is allowed to occur. During the electrolytic oxidization step (ii), the applied electric potential difference between the anode and cathode is from about 2 to about 6 volts.

Optionally, in step (ii), if the efficiency of oxidization of $Pb^{2+}$ is poor, sulfate ions are added to the solution during or after the electrolytic oxidation to enhance the formation of lead sulfate precipitate. The exemplary sulfate ions include but are not limited to sulfuric acid, sodium sulfate, or potassium sulfate.

Any solid-liquid separation method known to skilled artisans can be employed in step (iii) to separate solid tin and lead oxides and hydroxides, and optionally lead sulfate, from the solution. As discussed hereafter, the resultant solid tin and lead oxides and hydroxides are subjected to further treatments to recover tin and lead. The resultant filtrate is reused to prepare fresh tin or tin/lead stripping solution. The treated spent solutions are suitable for the preparation of fresh stripping solution since they contain less than about 1 g/L $Cu^{2+}$, about 10 g/L $Sn^{2+}$ and about 1 g/L $Pb^{2+}$.

It is not necessary to perform the electrolytic reduction step (i) and the electrolytic oxidization step (ii) in order. It is possible to reverse the order of steps (i) and (ii).

In step (iv) the resultant solid tin and lead oxides and hydroxides and optional lead sulfate after solid-liquid separation are dissolved in strong alkali or acidic solution. The useful strong alkali includes, but is not limited to, sodium hydroxide, potassium hydroxide or a mixture of the two. A mixture of sodium hydroxide and potassium hydroxide is preferred, and the mixture of sodium hydroxide and potassium hydroxide in a molar ratio of about 1:9 to about 4:6 is more preferable. When the equivalent of strong alkali is between about 2 N and about 7N, the strong alkali is capable of dissolving more solid precipitate. In addition, the useful strong acid includes, but is not limited to, sulfuric acid, hydrochloric acid or a mixture of the two. The suitable temperature during the dissolving step (iv) is greater than about 50° C., preferably between about 80° C. and about 95° C. When equilibrium is attained, the concentration of tin in the solution is about 20 g/L to about 30 g/L. Optionally, small amounts of inorganic salts, such as sodium chloride, potassium chloride, sodium fluoride or potassium fluoride are added to elevate the dissolved amounts of precipitate. For example, when about 0.5 g/L to about 5 g/L of inorganic salts are included in the solution, the concentration of tin in the solution is increased to about 30 g/L to 50 g/L.

The step for recovering metallic tin and lead by electrolytic reduction (v) is preformed at a high temperature, preferably about 50° C. to about 105° C. The electric potential difference between the anode and cathode is from about 1.5 volts to about 7 volts. When the concentration of tin in the treated solution is below 5 g/L, the solution is recycled so more solid tin and lead oxides and hydroxides can be dissolved in the recycled solution. If desired, the recovered metallic tin and lead are added to $SnSO_4$ solution and then subjected to electrolytic refinement to produce high purity of metallic tin. The procedures and conditions used for electrolytically refining the recovered metallic tin are the same as the known electrolytic refinement process for crude copper.

The objective and advantage of the present invention will be described in more detail by way of the non-limiting examples with reference to the drawing.

EXAMPLE 1

600 mL of the spent tin/lead stripping solution containing 7.58 g/L $Cu^{2+}$, 20.1 g/L $Fe^{2+}/Fe^{3+}$, 30.9 g/L $Sn^{2+}$ and 9.71 ppm $Pb^{2+}$ was electrolytically reduced to metallic copper at a temperature of 15° C. and at an electric potential difference between the anode and cathode of 3.0 volts. Then, the solution was subjected to electrolytic oxidization to form tin and lead oxides and hydroxides at a temperature of 70° C. and at an electric potential difference between the anode and cathode of 4.0 volts. Last, the solution was subjected to electrolytic reduction again to form copper at a temperature of 15° C. and at an electric potential difference between the anode and cathode of 3.0 volts. The treated waste stripping solution contained 1.0 g/L $Cu^{2+}$, 15.0 g/L $Fe^{2+}/Fe^{3+}$, 7.3 g/L $Sn^{2+}$ and 9.59 ppm $Pb^{2+}$, which is useful for preparing fresh stripping solution.

EXAMPLE 2

2.5L of the spent tin/lead stripping solution containing 5.77 g/L $Cu^{2+}$, 19.32 g/L $Fe^{2+}/Fe^{3+}$, 34.6 g/L $Sn^{2+}$ and 5.58 ppm $Pb^{2+}$ was electrolytically reduced to form metallic copper at a temperature of 15° C. and at an electric potential difference between the anode and cathode of 3.0 volts. Then, the solution was subjected to electrolytic oxidization to form tin and lead oxides and hydroxides at a temperature of 65° C. and at an electric potential difference between the anode and cathode of 4.0 volts. Last, the solution was subjected to electrolytic reduction to form copper again at a temperature of 15° C. and at an electric potential difference between the anode and cathode of 3.0 volts. The treated waste solution contained 0.34 g/L $Cu^{2+}$, 14.0 g/L $Fe^{2+}/Fe^{3+}$, 5.77 g/L $Sn^{2+}$ and 2.81 ppm $Pb^{2+}$, which is useful for preparing fresh stripping solution.

EXAMPLE 3

Both of the treated waste stripping solutions, respectively obtained in Examples 1 and 2 were subjected to solid-liquid separation to obtain solid tin and lead oxides and hydroxides. The solid tin and lead oxides and hydroxides were dissolved in 1 L of a mixture of sodium hydroxides and potassium hydroxides at a molar ratio of 3:7 having the alkali equivalent of 3 N after stirring for 30 minutes. After stirring, the non-dissolved solids in the alkali solution were removed through filtration so the resultant filtrate contained 27.8 g/L tin. The resultant filtrate was electrolytically reduced at a temperature of 95° C. and at an electric potential difference of 3.0 volts. After 6 hours, the concentration of tin in the solution is 3.5 g/L, and about 24 g of metallic tin was recovered.

The above examples merely illustrate the embodiments of the present invention. They are not intended to limit the present invention to a specific form. Skilled artisans can accomplish any modification or changes to the present invention after realizing the present invention. However, such modification and changes are within the scope of the appended claims.

What is claimed is:

1. A method for treating spent tin or tin/lead stripping solution, comprising:

(i) electrolytically reducing copper ions in the solution to copper at a low temperature;

(ii) electrolytically oxidizing $Sn^{2+}$ and $Pb^{2+}$ in the solution at a high temperature to form solid tin and lead oxides and hydroxides;

(iii) separating solid tin and lead oxides and hydroxides from the solution;

(iv) dissolving tin and lead oxides and hydroxides obtained in step (iii) in a strong alkali or acidic solution; and (v) electrolytically reducing the alkali or acidic solution obtained in step (iv) at a high temperature to recover metallic tin and lead.

2. The method according to claim 1, wherein during step (i), the electrolytic reduction is conducted at a temperature of about −5° C. to about 40° C.

3. The method according to claim 1, wherein during step (i), the electric potential difference applied between the anode and cathode is from about 1 volt to about 5 volts.

4. The method according to claim 1, wherein during step (ii), the electrolytic oxidization is conducted at a temperature of about 45° C. to about 100° C.

5. The method according to claim 1, wherein during step (ii), the electric potential difference applied between the anode and cathode is from about 2 volts to about 6 volts.

6. The method according to claim 1, where during or after step (ii), compounds containing sulfate ions are optionally added to the solution.

7. The method according to claim 6, wherein the compounds containing sulfate ions are sulfuric acid, sodium sulfate, or potassium sulfate.

8. The method according to claim 1, wherein the order of steps (i) and (ii) can be reversed.

9. The method according to claim 1, wherein the filtrate obtained in step (iii) is reused for preparing fresh stripping solution.

10. The method according to claim 1, wherein during step (iv), the strong alkali is sodium hydroxide, potassium hydroxide, or a mixture of the two.

11. The method according to claim 10, wherein the strong alkali has the alkali equivalent of about 2 N to about 7 N.

12. The method according to claim 10, wherein the strong alkali is a mixture of sodium hydroxide and potassium hydroxide.

13. The method according to claim 12, wherein the molar ratio of the sodium hydroxide to potassium hydroxide is about 1:9 to about 4:6.

14. The method according to claim 1, wherein the strong acid is sulfuric acid, hydrochloric acid, or a mixture of the two.

15. The method according to claim 1, wherein during step (iv), the temperature for dissolving is above 50° C.

16. The method according to claim 15, wherein the temperature for dissolving is between about 80° C. and about 95° C.

17. The method according to claim 1, wherein during step (v), the electrolytic reduction is performed at a temperature in the range of about 50° C. to about 105° C.

18. The method according to claim 1, wherein during step (v), the electric potential difference applied between the anode and the cathode is from about 1.5 volts to about 7 volts.

19. The method according to claim 1, wherein during step (v), when the concentration of tin in the solution is below 5 g/L, the solution is recycled so more solid tin and lead oxides and hydroxides can be dissolved into the solution.

20. The method according to claim 1, wherein the metallic tin and lead recovered in step (v) is further subjected to electrolytic refinement in the $SnSO_4$ solution.

* * * * *